United States Patent
Anderson et al.

(10) Patent No.: US 12,307,386 B2
(45) Date of Patent: May 20, 2025

(54) VOICE RECOGNITION OF SITUATIONAL AWARENESS

(71) Applicant: Rockwell Collins, Inc., Cedar Rapids, IA (US)

(72) Inventors: Ross D. Anderson, Lakeville, MN (US); Subhashish Chakravarty, Marion, IA (US); Matthew T. Higgins, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 538 days.

(21) Appl. No.: 17/705,058

(22) Filed: Mar. 25, 2022

(65) Prior Publication Data

US 2023/0306285 A1    Sep. 28, 2023

(51) Int. Cl.
| | |
|---|---|
| *G10L 15/26* | (2006.01) |
| *G06F 40/35* | (2020.01) |
| *G06N 5/02* | (2023.01) |
| *G06N 5/04* | (2023.01) |
| *G10L 15/30* | (2013.01) |

(52) U.S. Cl.
CPC .............. *G06N 5/04* (2013.01); *G06F 40/35* (2020.01); *G06N 5/02* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 9,299,347 B1 * | 3/2016 | Siohan | G10L 15/02 |
| 9,542,648 B2 | 1/2017 | Roberts | |
| 10,762,113 B2 | 9/2020 | Jia et al. | |
| 10,909,441 B2 | 2/2021 | Gao et al. | |
| 10,922,360 B2 | 2/2021 | Mel et al. | |
| 10,970,278 B2 | 4/2021 | Yan et al. | |
| 11,017,764 B1 | 5/2021 | Das et al. | |
| 11,086,858 B1 | 8/2021 | Koukoumidis et al. | |

(Continued)

FOREIGN PATENT DOCUMENTS

| | | | |
|---|---|---|---|
| CN | 106776729 A | 5/2017 | |
| CN | 110569345 A | 12/2019 | |

(Continued)

OTHER PUBLICATIONS

Extended European Search Report dated Aug. 10, 2023; European Application No. 23163264.7.

(Continued)

*Primary Examiner* — Seong-Ah A Shin
(74) *Attorney, Agent, or Firm* — Suiter Swantz IP

(57) ABSTRACT

A pilot, commander, or user within an aircraft may ask a query via voice. The query may be converted into text and used to search a knowledge graph. The result from the query may be provided to the user such that the user may obtain improved situational awareness during a mission or otherwise while flying. A line-replaceable unit of the aircraft may execute an architecture for searching the knowledge graph. The knowledge graph may include a schema based, at least in part, on a mission requirement of an aircraft and one or more aircraft systems of the aircraft. Thus, the user may ask for the effect of various sensors or components of the aircraft systems as it relates to the mission.

13 Claims, 5 Drawing Sheets

(56) References Cited

U.S. PATENT DOCUMENTS

| | | |
|---|---|---|
| 11,188,580 B2 | 11/2021 | Osmon et al. |
| 11,816,677 B2* | 11/2023 | Copeland .......... G06F 16/90332 |
| 2002/0123989 A1* | 9/2002 | Kopelman ............ G06F 16/334 |
| 2016/0259341 A1* | 9/2016 | High ....................... H04W 4/80 |
| 2019/0036856 A1* | 1/2019 | Bergenlid ............... H04L 51/10 |
| 2019/0214002 A1* | 7/2019 | Park ........................ G10L 15/30 |
| 2019/0354860 A1* | 11/2019 | Karg ..................... G06F 18/231 |
| 2020/0160199 A1* | 5/2020 | Al Hasan ............... G06N 20/00 |
| 2021/0295710 A1* | 9/2021 | Saptharishi ............. G10L 15/26 |
| 2021/0303636 A1 | 9/2021 | Dua et al. |
| 2021/0398021 A1* | 12/2021 | Vaishampayan ...... G06F 9/5038 |
| 2022/0236904 A1* | 7/2022 | Miller ................... G06F 3/0673 |
| 2024/0101132 A1* | 3/2024 | Šoštaric ............ B60W 50/0098 |
| 2024/0382982 A1* | 11/2024 | Kim .......................... B05B 1/34 |

FOREIGN PATENT DOCUMENTS

| | | |
|---|---|---|
| CN | 112597272 A | 4/2021 |
| EP | 3509061 A1 | 7/2019 |
| WO | 2019011824 A | 1/2019 |

OTHER PUBLICATIONS

Van Oijen, Joost, et al., (2021). Building Conversational Agents for Military Training: Towards a Virtual Wingman. 10.1007/978-3-030-77772-2_34.

Wang, Meng et al., "Learning to Hash for Efficient Search Over Incomplete Knowledge Graphs", 2019 IEEE International Conference on Data Mining (ICDM), Downloaded on Feb. 25, 2022, 6 pages.

* cited by examiner

VOICE RECOGNITION OF SITUATIONAL AWARENESS

TECHNICAL FIELD

The present invention generally relates to situational awareness during flight, and more specifically to voice-based natural language queries for aircraft information.

BACKGROUND

Pilots receive a number of information provided on their displays. However, not all collected data is provided on the display to prevent information overload. Thus, aircraft displays may not provide sufficient ad-hoc or in-depth data. For example, Global Weather data, ground crew availability, mission equipment capabilities or capacities, and other aircraft in mission may be collected but not displayed to the pilot. Instead, such information may be read aloud to the pilot by mission control or another team member. Therefore, it would be advantageous to provide a device, system, and method that cures the shortcomings described above.

SUMMARY

A line-replaceable unit is disclosed, in accordance with one or more embodiments of the present disclosure. In one illustrative embodiment, the line-replaceable unit includes a non-transitory memory maintaining program instructions and a knowledge graph. In another illustrative embodiment, the knowledge graph includes a schema with a plurality of nodes and a plurality of edges based, at least in part, on a mission requirement of an aircraft and one or more systems of the aircraft. In another illustrative embodiment, the line-replaceable unit includes one or more processors. In another illustrative embodiment, the one or more processors are configured to execute the program instructions maintained on the memory. In another illustrative embodiment, the program instructions cause the one or more processors to receive an audio input corresponding to a query from a user within the aircraft. In another illustrative embodiment, the program instructions cause the one or more processors to convert the audio input to text. In another illustrative embodiment, the program instructions cause the one or more processors to generate a response for the user by performing a query of the knowledge graph based on the text. In another illustrative embodiment, the program instructions cause the one or more processors to provide the response to the user.

A system is disclosed, in accordance with one or more embodiments of the present disclosure. In one illustrative embodiment, the system includes a head-mounted display configured to generate an audio input. In another illustrative embodiment, the system includes a non-transitory memory maintaining program instructions and a knowledge graph. In another illustrative embodiment, the knowledge graph includes a schema with a plurality of nodes and a plurality of edges based, at least in part, on a mission requirement of an aircraft and one or more systems of the aircraft. In another illustrative embodiment, the system includes one or more processors configured to execute the program instructions maintained on the memory. In another illustrative embodiment, the program instructions cause the one or more processors to receive the audio input, the audio input corresponding to a query from a user within the aircraft. In another illustrative embodiment, the program instructions cause the one or more processors to convert the audio input to text. In another illustrative embodiment, the program instructions cause the one or more processors to generate a response for the user by performing a query of the knowledge graph based on the text. In another illustrative embodiment, the program instructions cause the one or more processors to provide the response to the user by way of the head-mounted display.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
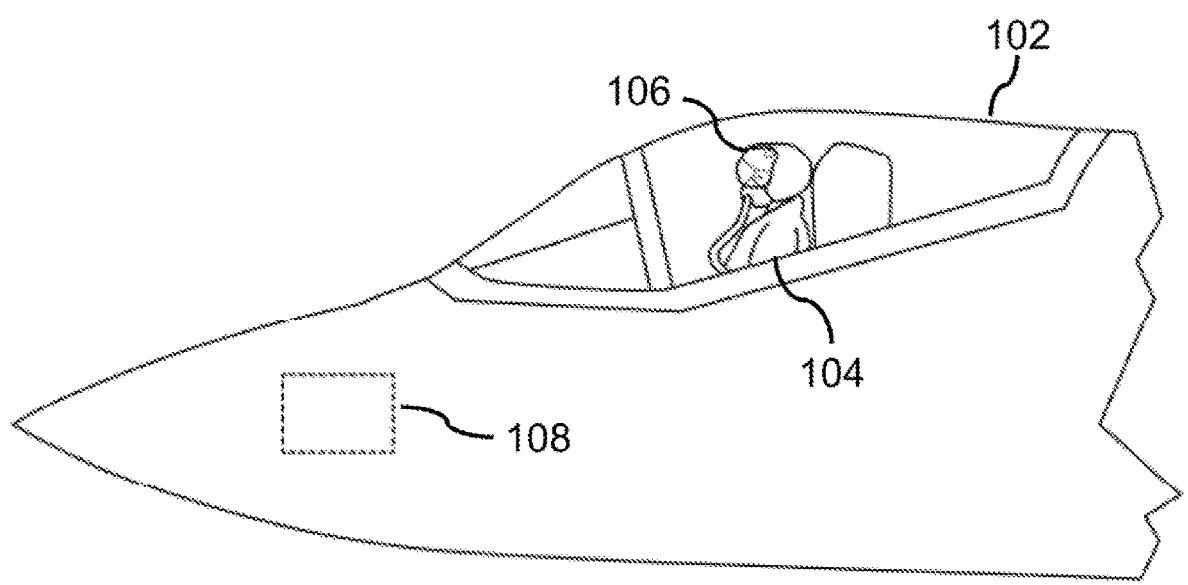
FIG. 1 depicts a nose portion of an aircraft, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to an architecture. The architecture may provide for a conversational query service that stores relevant information into a knowledge graph. The architecture further provides for translating a voice query from a user into a text query for information contained within the knowledge graph. The architecture further provides for responding to the voice query with the information. The response provided to the user may improve a situational awareness of the user while the user maintains hands and eyes in an operational position.

Referring now to FIG. 1, a nose portion of an aircraft 100 is described, in accordance with one or more embodiments of the present disclosure. The aircraft 100 may include a cockpit 102 occupied by a user 104, such as a pilot, wearing a head-mounted display 106. In embodiments, the head-mounted display 106 is in communication with a line-replaceable unit 108. The line-replaceable unit 108 may be a system located within the aircraft 100. The line-replaceable unit 108 may receive an audio input from the user 104 (e.g., by way of the head-mounted display 106) and provide a response to the user 104 (e.g., by way of the head-mounted display 106), thereby improving the situational awareness of the user 104. The line-replaceable unit 108 may process the audio input and provide a response to the user 104, as described further herein. The pilot may thus use voice queries to obtain situational awareness regarding the aircraft 100, a mission, and the like. The line-replaceable unit 108 may allow a pilot, operator, or commander to use voice queries to obtain situational awareness information regarding their vehicle or mission using a knowledge graph. For example, the pilot may query teaming information regarding the status of the other aircrafts in the mission. The pilot may also query causal information, such as how the information affects the pilot.

Figure 2:
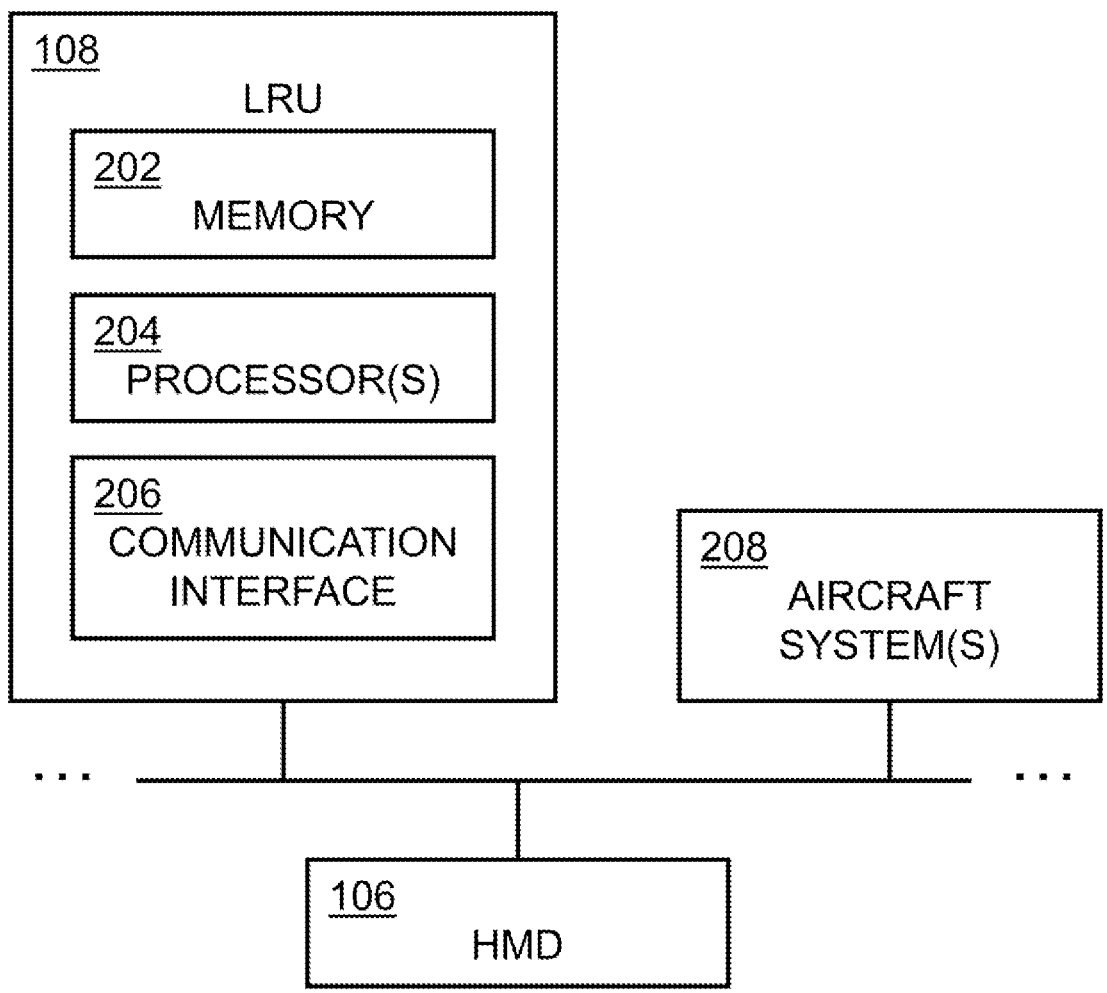
FIG. 2 depicts a block diagram of a line-replaceable unit of an aircraft, in accordance with one or more embodiments of the present disclosure.

Referring now to FIG. 2, a simplified block diagram of the line-replaceable unit 108 of the aircraft 100 is described, in accordance with one or more embodiments of the present disclosure. The line-replaceable unit 108 may include a memory 202, one or more processors 204, and a communication interface 206. The memory 202 may include a non-transitory memory which maintains program instructions and a knowledge graph (e.g., knowledge graph 308). The processors 204 may be configured to execute the program instructions for converting a received audio input from the user 104 into text and generating a response for the user by performing a query of the knowledge graph. The communication interface 206 may communicatively couple the line-replaceable unit 108 with one or more components of the aircraft 100, such as the head-mounted display 106 or one or more aircraft systems 208.

For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 204 may include any device configured to execute algorithms and/or instructions (e.g., program instructions stored in memory 202). Furthermore, the memory 202 may include any storage medium known in the art suitable for storing program instructions executable by the associated processor 204. For example, the memory medium may include a non-transitory memory medium. By way of another example, the memory medium may include, but is not limited to, a read-only memory (ROM), a random-access memory (RAM), a magnetic or optical memory device (e.g., disk), a solid-state drive and the like. It is further noted that memory medium may be housed in a common controller housing with the processor 204. In embodiments, the memory medium may be located remotely with respect to the physical location of the processor 204.

In some embodiments, the processor 204 is configured to receive the information from the communication interface 206. The communication interface 206 may include any wireline communication protocol (e.g., DSL-based interconnection, cable-based interconnection, T9-based interconnection, and the like) or wireless communication protocol (e.g., GSM, GPRS, CDMA, EV-DO, EDGE, WiMAX, 3G, 4G, 4G LTE, 5G, Wi-Fi protocols, RF, Bluetooth, and the like) known in the art. By the communication interface 206, the processor 204 may be configured to receive information from the one or more of the head-mounted display 106 or the aircraft system(s) 208. The aircraft system 208 may include, but is not limited to, an electrical system, a thermal system, an engine system, a hydraulic system, an avionics system (e.g., for communicating with mission control or another asset), a landing gear system, a fuel system, or the like. For example, the processor 204 may be configured to receive an audio input from the head-mounted display 106 and may be further configured to provide one or more of an audio output to the head-mounted display 106 or a change a display of the head-mounted display 106 in response to the audio input. By way of another example, the processor 204 may be configured to receive various data from the aircraft system 208 for updating a knowledge graph.

Figure 3:
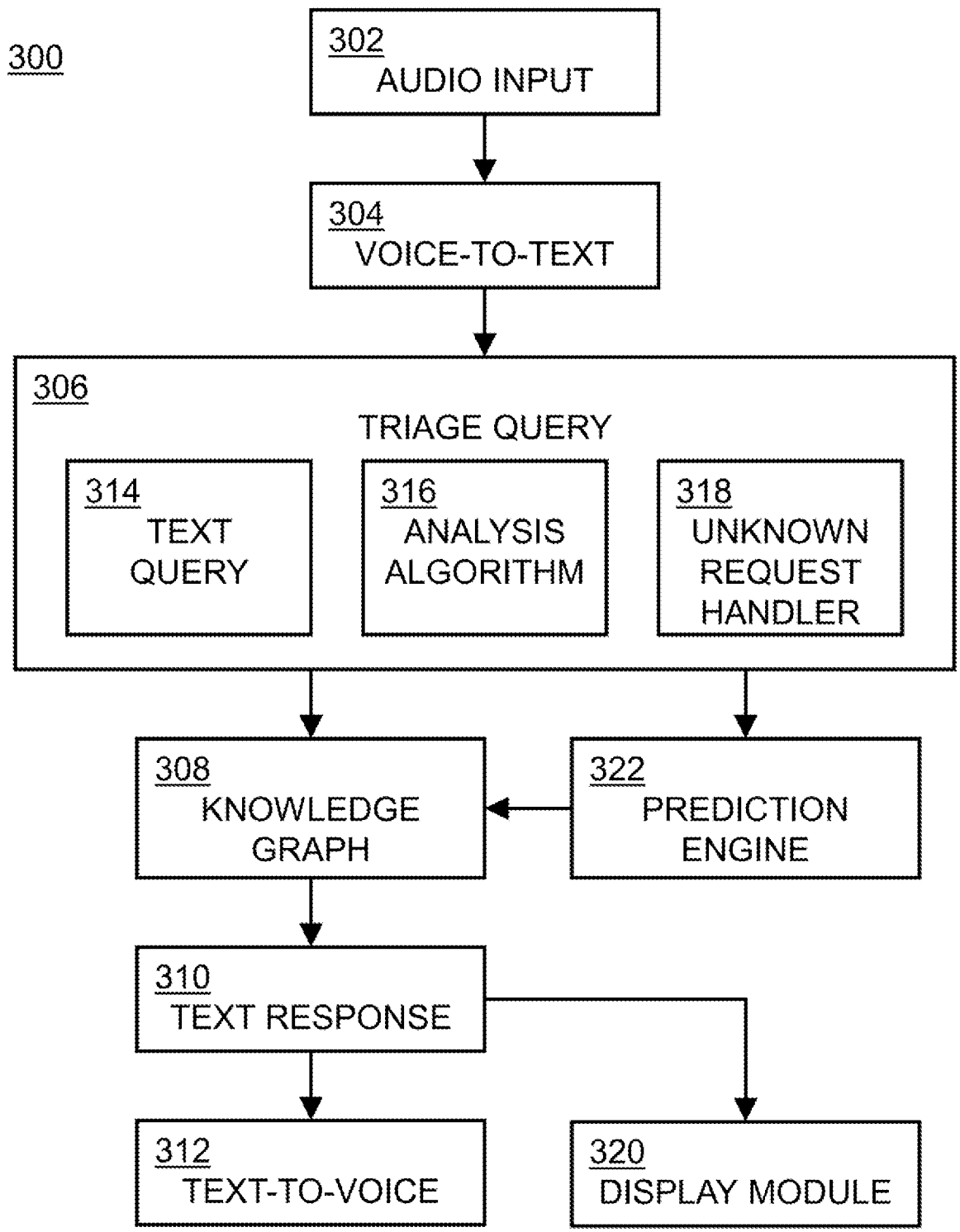
FIG. 3 depicts a processor-executable architecture, in accordance with one or more embodiments of the present disclosure.

Referring now to FIG. 3, an architecture 300 is described, in accordance with one or more embodiments of the present disclosure. The architecture 300 may provide for a conversational query service that stores relevant information into a knowledge graph and can translate a human voice query into a query for information contained in the knowledge graph. The inputs for the architecture 300 may include, but are not limited to, knowledge graph data to be queried, voice-based question, analysis algorithms or models that can respond to questions based upon context of the question, and/or information obtained from the knowledge graph. The outputs from the architecture 300 may include, but are not limited to, information obtained from the knowledge graph or computed outputs. The architecture 300 may thus support voice based natural language queries on-board vehicle and off the vehicle, as part of pre-mission planning, for determining current mission status, and post-mission analysis.

In embodiments, the processor 204 of the line-replaceable unit 108 implements the architecture 300 by executing the program instructions maintained on the memory 202. The processor 204 may receive an audio input 302. The audio input 302 may correspond to a query from the user 104 within the aircraft (e.g., pilot, crew, or passenger) or from mission control. The processor 204 may further convert the audio input 302 to text by a voice-to-text module 304. The voice-to-text module 304 may employ any number of speech recognition models or methodologies. For example, the voice query may be translated into text by a software platform from Raytheon BBN Technologies or the like.

The processor 204 may also perform a triage query 306 on the text generated by the voice-to-text module 304. The triage query 306 may include one or more of a text query 314, an analysis algorithm, and an unknown request handler 318. By the triage query 306, the processor 204 may be configured to perform simple lookups of the knowledge graph 308, perform causal analysis of the knowledge graph 308, and handle unknown requests. The triage query 306 may be performed to reduce a processing requirement of the line-replaceable unit 108. In this regard, by segmenting the direct lookups apart from the causal analysis algorithms, a processing requirement for the direct lookup may be reduced. Reducing the processing requirement is particularly advantageous where the architecture 300 is implemented by edge computing (e.g., onboard the line-replaceable unit 108 of the aircraft 100), where processing resources or power requirements may be constrained.

The text query 314 may be considered a simple lookup of the knowledge graph 308. The lookup may include a query in a declarative graph query language, such as, Cypher query language. The lookup may also include a knowledge graph query generated by a machine learning algorithm. The query may then be run on the knowledge graph 308. The triage query 306 may identify the text query 314 using one or more words or phrases in the text that are recognized in the knowledge graph. For example, the text query 314 may include, but is not limited to, a sensor lookup regarding the outside air temperature.

The triage query 306 may also include the analysis algorithm 316. The analysis algorithm 316 may include one or more of a causal lookup, a complex lookup, or a remote lookup. The analysis algorithm 316 may be invoked to collect data from the knowledge graph 308 in a question format which would not be conducive as a simple lookup. For example, the causal analysis may include, but is not limited to, providing a response to "what-if" questions. In this regard, the causal analysis may include a number of subroutines which may require additional processing power. The analysis algorithm 316 may recognize the intent of question. The intent may be recognized using a natural language processing (NLP) algorithm. The analysis algorithm 316 may then perform a search to capture data associated with the intent and process the data using a machine learning algorithm, causal model, and the like. By processing the data, the data may be related back to the recognized intent. In this regard, the causal analysis may include determining what analysis needs to be provided, get data needed to accomplish the analysis, and perform the analysis on the data. Such analysis may include a number of subroutines. For example, the analysis algorithm 316 may handle a question of the form "what is the effect on the mission if the hydraulic pump fails". The analysis algorithm 316 may recognize the intent of the question and perform a nearest neighbor's search on the effects of previous missions where a hydraulic pump of the aircraft 100 has failed. The analysis algorithm 316 may thus include a higher level of complexity than the text query 314. By way of example, the aircraft 100 may include hundreds of thousands or millions of component parts. The user 104 may be interested in determining the remaining useful life of one or more of the components. The components may be monitored by one or more of the aircraft systems 208, such as, but not limited to, electrical systems, thermal systems, engine systems, hydraulic systems, avionics systems, landing gear systems, fuel systems, and the like. For example, the hydraulic components may be represented by nodes, with the physical connections of the hydraulic components represented as a directional edge. The directional edges may then be used in a machine learning algorithm for causal analysis purposes, that if one component fails, the other component in the hydraulic line will usually fail. The relationship may thus be used for a microservice computation which indicates the extent of the relationship between the failure of the hydraulic pump with the continued operation of the oil filter. In embodiments, the triage query 306 may access different sections of the knowledge graph 308, and may access multiple sections of the knowledge graph 308 at once. In this regard, the pilot may ask two questions in one sentence. For example, the voice query may include what is the effect of this component on my aircraft, and how is a teamed aircraft performing. The analysis algorithm 316 may be beneficial in extending the capabilities of natural language processing to be more interactive than mere text queries.

The triage query 306 may also include the unknown request handler 318. The unknown request handler 318 may identify the text query as an unknown request. The unknown request handler 318 may further generate a reply to the user 104 that the request within the audio input is unknown. In embodiments, the unknown request handler 318 may also record the question within the knowledge graph 308, as an unknown question. Recording the question within the knowledge graph 308 may be advantageous for both reducing a processing time, in the event the question is asked a subsequent time, and for identifying and training the analysis algorithm 316 at a future training step.

The architecture 300 may include generating a text response 310 to the triage query 306. The text response 310 may be generated based on the text query 314, the analysis algorithm 316, or the unknown request handler 318. The response provided may correspond to one or more of a vehicle status, a mission status, an onboard event, and external event, a weather, an equipment capability, and equipment capacity, or the like. The architecture 300 may also include a text-to-voice module 312 for converting the text response 310 to an audible response for the user 104. The architecture 300 may also include a display module 320. The display module 320 may reconfigure the human machine interface (HMI) display of the user, such as, but not limited to, the head-mounted display 106, with an image response including information based on the text response 310. In this regard, the head-mounted display 106 may be considered a reconfigurable HMI. The audible response or the image response may improve the situational awareness of the user 104.

In embodiments, the architecture 300 includes a prediction engine 322. The prediction engine 322 may receive one or more inputs from the architecture 300, such as, but not limited to, outputs from the triage query 306, the knowledge graph 308, or the text response 310. For example, the prediction engine 322 may receive one or more of the text, the predicted intent, and the response. The prediction engine 322 may predict the one or more next questions based on the one or more inputs. Answers for the predicted next questions may then be determined based on information from the knowledge graph 308. The answers may similarly be provided as the text response 310. The prediction engine 322 may predict the next user query based upon what was asked and the answer to the query. For example, the prediction engine 322 may identify an urgency of the previous question, any related items, and the like. The prediction engine 322 may use a mesh question and response graphs to predict the next question. Questions and responses may be represented as nodes in the knowledge graph 308. The next question may be made as a choice amongst other nodes in the knowledge graph 308. In this regard, the answer may be represented in the same space as the question. A mesh question and response graph may also be used to find the next question. Determining the next question may be advantageous in providing a reconfigurable human-machine-interface (HMI), such as, the head-mounted display 106. The information that is of most urgent need may be presented to the user 104. By representing the questions as a knowledge graph, timestamping them, and learning where the next question is likely to occur, the user 104 may obtain situational awareness of the next situation which is imminent prior to the user 104 asking for the information.

The prediction engine 322 may also include a machine learning algorithm that predicts the remaining useful life of a component. The remaining useful life of the components may then be connected with a graphic on the head-mounted display 106, together with related information from the knowledge graph 308. For example, a fuel pump may have a remaining useful life which degrades over a mission. A pilot has previously asked a question regarding the fuel pump during the mission, at which point the pilot received a response regarding the percent of degradation or remaining life of the fuel pump. The prediction engine may take into account a degradation rate of the fuel pump which is stored in the knowledge graph 308 and provide a notification to the pilot at a future time regarding how much fuel remains in the fuel pump. The notification may be provided based on the degradation rate and the prior time at which the pilot requested the fuel pump information (e.g., notify prior to failure). By way of another example, the auto generated question may be of the form "how much time remaining to accomplish the mission objective given the percent of degradation or remaining life of the fuel pump". The processor 204 may then generate the response to the question and provide the response to the user 104. The generated response may also include providing alternative mission objections based on one or more mission planning nodes of the knowledge graph 308.

When using the predictive question methodology, uploading additional information to the knowledge graph 308 may be of importance. In this regard, the knowledge graph 308 may include a subset of all data available to reduce processing requirements. The prediction engine 322 may be configured to determine a trend in the question and store additional information in the knowledge graph 308 so that the amount of knowledge stored in the knowledge graph 308 matches the trend. If the trend doesn't match the data in the knowledge graph 308, the processor 204 may request additional data from the aircraft systems 208. For example, the additional data may be received from a data link connection to mission control, which may include a knowledge graph with additional information.

Figure 4:
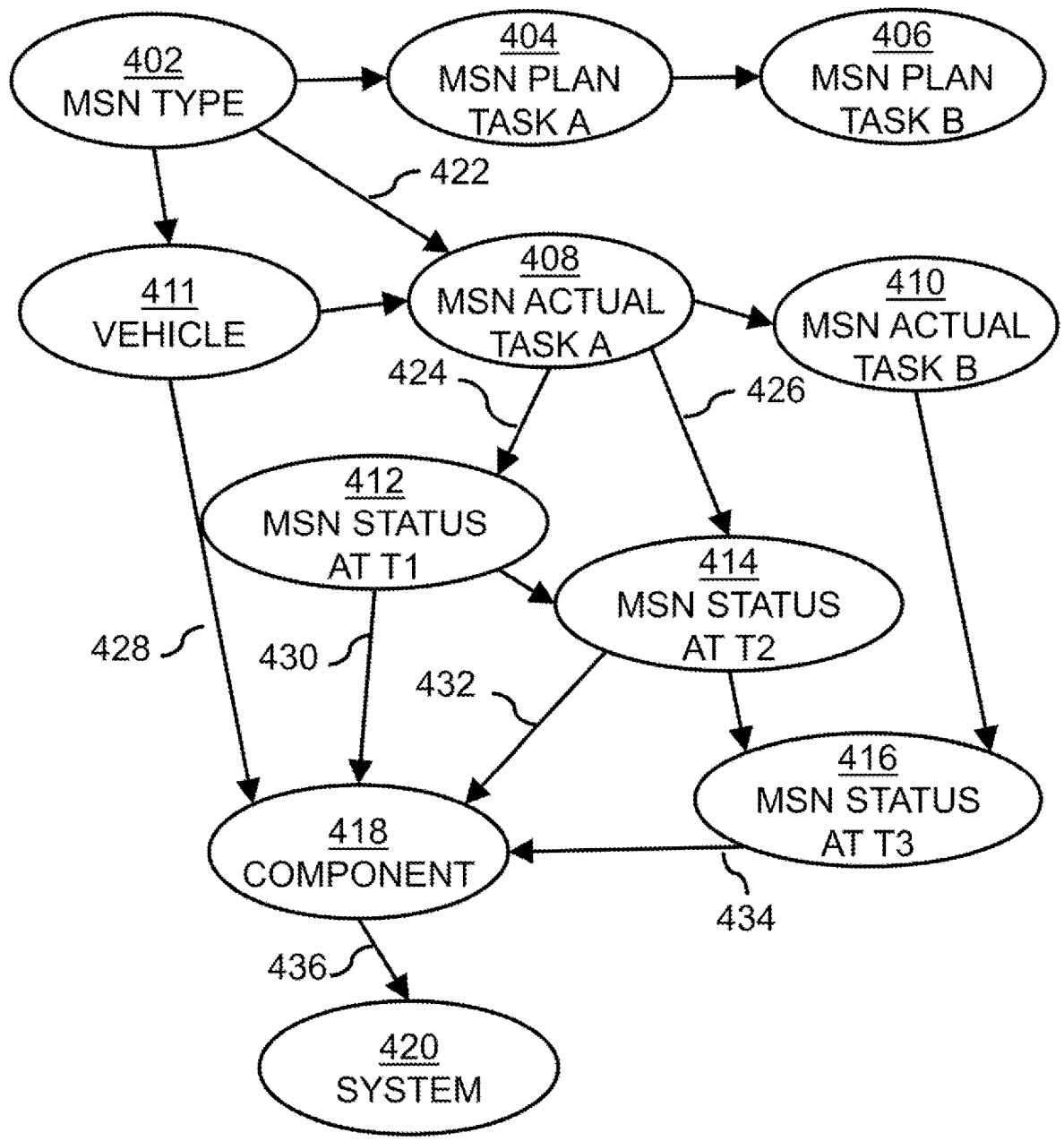
FIG. 4 depicts an exemplary knowledge graph, in accordance with one or more embodiments of the present disclosure.

Referring now to FIG. 4, the knowledge graph 308 is described, in accordance with one or more embodiments of the present disclosure. The use of the knowledge graph 308 may be advantageous given the flexibility of the knowledge graph 308 to accept and store information from various sources in different formats. The knowledge graph may also include a number of capabilities as a data storage model together with graph algorithms which connect one or more sections of the knowledge graph. The knowledge graph may also provide a semantic representation which is human interpretable or readable, as compared to a relational database management system (RDBMS) or the like. The knowledge graph 308 may encompass any data about the mission and even the mission itself. The knowledge graph 308 may provide a real-time feed of data coming in from vehicle systems or outside the vehicle. In embodiments, the knowledge graph 308 may include a schema which is defined prior to the mission.

The knowledge graph 308 may be received from one or more ground systems. The knowledge graph 308 may include the schema. The schema may be decided prior to executing a mission based on things that are needed for the mission. The schema may be based on a mission requirement of the aircraft 100 and the aircraft systems 208. For example, the knowledge graph 308 may include a multi-partite graph database. In this regard, the knowledge graph 308 may include one or more types of nodes. The nodes may include one or more types, such as, but not limited to, a mission type, a mission plan task, a mission actual task, a mission status, a time, a vehicle, a serial number, a type, a component, a subsystem, an onboard event, an external event, a weather, an equipment capability, and equipment capacity, and the like. Such nodes may be connected by one or more directional edges. The directional edges may indicate various attributes about the relationship of the nodes, such as, but not limited to, a start of task, an end of task, a status, a remaining useful life, a serial number, an installed date, and the like. As may be understood, the various examples described in reference to the nodes or edges of the knowledge graph 308 are not intended to be limiting. In embodiments, the schema for the knowledge graph 308 is pre-generated, and the data contained within the knowledge graph 308 is dynamically updated during flight. The knowledge graph 308 may be dynamically updated according to the schema from one or more data feeds, such as, but not limited to, a vehicle system, a weather system, a supply chain management system, mission control, one or more onboard sensors, and the like. The knowledge graph 308 may also be updated with previous mission experience received from mission control by way of an avionics systems. The knowledge graph 308 may be generated based on three stages of information, including mission preplanning (e.g., information that available prior to mission), in-flight information (e.g., situational awareness for the mission), and previous mission experience. The knowledge graph 308 may include a variety of information such as, but not limited to, vehicle level health feeds of the aircraft or other assets in the fleet, mission requirements and profiles, last known state of components, supply-chain databases, weather data, ground crew information, or the like.

The schema for the knowledge graph 308 may be modulated according to the mission needs. In embodiments, the schema is based, at least in part, on a mission level requirement document. A system modelling language (SYSML) diagram may be extracted from the mission level requirement document. The SYSML diagram may indicate a node connects to a second node via a data link, or the like. A text extraction engine may convert the mission requirements into the SYSML structures or a knowledge graph structure. For example, for a search and rescue mission a mission requirement may include a communication (COMMS) requirement. The COMMS requirement may include a need to communicate that an individual is extracted by a given time. The COMMS requirement may further include who needs to communicate to which entity and over which radio. In this example, these three things form the two nodes and the relationship or the edge connecting the two nodes. The SYSML diagram may then be used to form the knowledge graph 308. The schema is thus pre generated and the knowledge graph 308 is dynamically updated throughout the mission. The knowledge graph 308 is filled in as the mission progresses based on the values received from the aircraft systems 208. The knowledge graph 308 may be dynamically updated such that there is a timestamp associated with each entry. For example, the mission may include a need to track each and every component on the aircraft 100. The mission may further include a need to track Air Launched Effects (ALEs) as the mission unfolds. Tracking the ALEs may include the positions of the ALEs, how many regimes in the mission remain, which regime the ALE is in, and the like. By way of another example, if a part is failing then the query may be tied back to which replacement parts can be preordered, which supply chain vendor has the replacement part, and the like.

The schema may also be determined based on what the pilot needs in real-time, such as, but not limited to, the remaining useful life of the components, what action should the pilot take (e.g., mission as a go), warnings and the related instrumentation available to the pilot, are any warnings coming up from the OMS, and the like. In this regard, the knowledge graph 308 may function as a data dump of a number of processes which are running in the background inside the aircraft 100 which affect the mission.

In embodiments, the knowledge graph 308 may be operated in a limited resource environment, such as edge processing on the line replaceable unit 108 of the aircraft 100. The architecture 300 may include one or more processing solutions to reduce a dimensional complexity or scale of the knowledge graph 308. For instance, as the size of the knowledge graph 308 increases, nodes which are directly connected, by one hop or one step connection, may be analyzed. Nodes which are more remotely connected by two hop connections, three hop connections, or more may be less relevant and thus disregarded when determining a real-time answer.

As depicted in FIG. 4, an exemplary knowledge graph 308a may include one or more nodes, such as, but not limited, a mission type node 402, a mission plan task A node 404, a mission plan task B node 406, a mission actual task A node 408, a mission actual task B node 410, a vehicle node 411, a mission status at time T1 node 412, a mission status at time T2 node 414, a mission status at time T3 node 416, a component node 418, and a system node 420. In an exemplary embodiment, the component node 418 is a primary hydraulic pump. The vehicle node 411 is coupled to the mission actual task A node 408 by an edge 422, indicating the aircraft is undertaking the task A. The mission actual task A node 404 is coupled to the mission status at T1 node 412 by an edge 424 and is coupled to the mission status at T2 node 414 by an edge 426, indicating the Task A was started as time T1 and completed at time T2. The component node 418 is coupled to the vehicle node 411 by an edge 428. The edge 428 may represent one or more of a serial number of the component node 418 and an installation date of the component node 418 on the aircraft. The mission status at T1 node 412 may be coupled to the component node 418 by an edge 430, the mission status at T2 node 414 may be coupled to the component node 418 by an edge 432, and the mission status at T3 node 416 may be coupled to the component node 418 by an edge 434. The edges 430, 432, 434 may indicate one or more of a status of the component at the associated time and a remaining useful life of the component. For example, the edge 430 and the edge 432 may indicate the status of the primary hydraulic pump is healthy and the remaining useful life has decreased by a given number of hours from time T1 to time T2. By way of another example, the edge 434 may indicate the status of the primary hydraulic pump has failed with a limited remaining useful life (e.g., one hour or less). The component node 418 may be coupled to the system node 420 by an edge 436. For example, the system node 420 may be a hydraulic system of the aircraft such that the edge 436 may indicate the component node 418 is part of the hydraulic system. As may be understood, the exemplary knowledge graph 308a depicted in FIG. 4 is not intended to be limiting. In this regard, the mission type node 402 may have a number of vehicle nodes and a number of mission tasks, with each of the vehicle assigned one or more of the mission tasks. Furthermore, each vehicle node 411 may include several thousand or more component nodes 418 which may be included with one or more system nodes 420 of the vehicle. Furthermore, each mission task may include a number of statuses taken at any given time interval. Thus, the knowledge graph 308a is merely shown for exemplary illustration of how the knowledge graph 308 may be used to maintain information for generating responses to queries regarding the effect of aircraft components on the mission.

Figure 5:
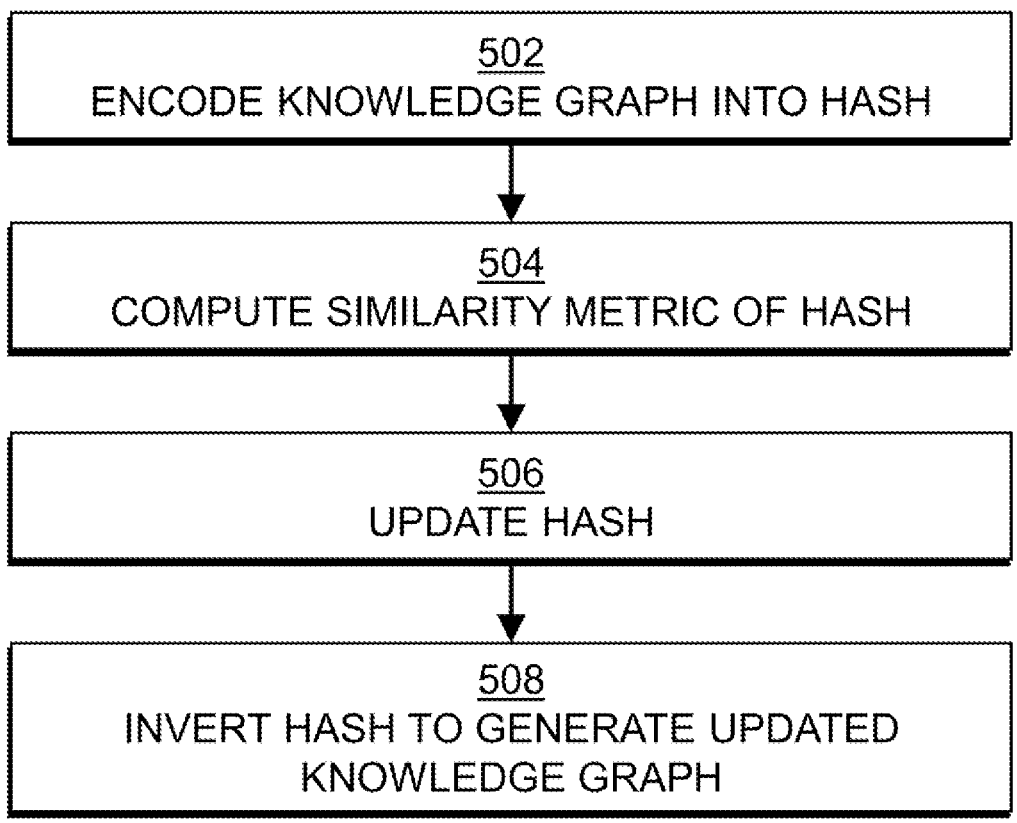
FIG. 5 depicts an encoding process for a knowledge graph, in accordance with one or more embodiments of the present disclosure.

Referring now to FIG. 5, an encoding process 500 for the knowledge graph 308 is described, in accordance with one or more embodiments of the present disclosure. In embodiments, the line-replaceable unit 108 may implement one or more processes to address the limited processing in the cockpit together with having a knowledge graph with less information that a knowledge graph maintained at mission control. For example, the line-replaceable unit 108 may store encoded vectors (also referred to herein as sketches) of the knowledge graph. The encoded vectors may be relevant for the current mission but may not include all available information. The mission control may include a knowledge graph with the information from the sketches together with all other available information, such as, prior mission data, a supply chain knowledge graph, or the like. The encoded vectors of the knowledge graph may also be dynamically updated by requesting additional information from the mission control. The use of the encoded vectors may be advantageous in assisting the prediction engine 322

In embodiments, the knowledge graph 308 is encoded into a hash 502. The hash 502 may provide a lower dimensional space than the knowledge graph 308. The knowledge graph 308 may be encoded into the hash 502 by a learning-based approach. For example, the hash 502 may include nodes and edges which are encoded into a vector. In this regard, the nodes of the knowledge graph 308 may be represented as a subject and an object, with the edges of the knowledge graph 308 represented as a relation connecting the subject and the object. The prediction engine 322 may then use a model which is applied to the hash 502 for recommending a next question. A similarity metric 504 of the hash 502 may be then be computed. The similarity metric 504 may indicate a distance between points in the hash 502. The similarity metric 504 may be computed in any suitable manner, such as, but not limited to, by a Euclidian distance or a hamming distance calculation. New situations can be appended to the hash 502 using information theoretic methods, thereby generating an updated hash 506. The updated hash 506 may then be inverted to generate an updated knowledge graph 508 at the end of the mission. The knowledge graph 508 may be used to update the knowledge graph maintained by mission control.

Referring generally again to FIGS. 1-5. Some exemplary uses of the architecture 300 are now provided. The architecture 300 may provide for obtaining health of equipment, such as camera state or rotor transmission, which would otherwise be unavailable on a display. The architecture 300 may also provide for impacts associated with weather events or if a deviation from a mission plan is likely to occur. The architecture 300 may estimate time or fuel required to reach an alternate location. The architecture 300 may predict "what if" scenarios, such as what is the effect on the mission if the primary hydraulic pump fails. The architecture 300 may take note of an event that occurred for future investigation or reporting, such as, a possible equipment failure, abnormal noises, and the like. The architecture 300 may provide an interactive checklist assistant. The architecture 300 may order a part or determine the time to receive a part based upon supply-chain management (SCM) data. The architecture 300 may obtain the installation history of a component. It is further contemplated that the architecture 300 may be beneficial for a number of additional uses, such that the exemplary uses described above is not intended to be limiting.

In embodiments, the triage query 306 may be based on a model generated by a number of methods, such as, but not limited to, a knowledge graph deep q learning (KGDWN) or a question generation reinforcement learning. Machine learning techniques or methodologies may include reinforcement learning. Reinforcement learning may include deep Q Learning. Deep Q learning may provide a method to generate or anticipate questions. The use of Deep Q learning may be advantageous when there is insufficient data to train the triage querying engine. For example, based on how the mission progresses and based on data from real pilots, real missions and what interests the pilots, a machine learning system may be trained to generate pilot-like questions. The triage querying engine may then be trained with the pilot-like questions generated by the machine learning system. If a list is used to start the training, a rank may be generated as to whether the questions are simple, does the question require some causal computation, or is the questions ask something that does not include an answer in the knowledge graph.

Although the user 104 is described and depicted as being a pilot, this is not intended as a limitation of the present disclosure. In this regard, a number of users may be disposed within the aircraft 100, such as, but not limited to, other crewmembers or passengers (e.g., where the aircraft 100 is a passenger aircraft).

Although much of the present disclosure is described in reference to edge processing by a line-replaceable unit (LRU), or the like, onboard the aircraft 100, this is not intended as a limitation of the present disclosure. In embodiments, the architecture 300 may be applicable to mission control on the ground, such as to allow ground personnel (dispatch, maintenance, etc.) to obtain situational awareness information regarding a vehicle or parts supply using a knowledge graph 308. In this regard, the mission control may include a controller with a processor and a memory. The controller may receive data feeds of similar information from various systems or subsystems. The controller may then use the architecture 300 for responding to verbal requests for information from one or more users within mission control.

Although much of the present disclosure is related to non-commercial aircraft applications, this is not intended as a limitation of the present disclosure. The communication system may be usable on commercial aircraft applications. However, the use of the communication system on commercial aircraft applications may encounter an additional layer of complexity, given that flight standards associations (e.g., the Federal Aviation Administration) may limit what is shared between airlines. However, the architecture 300 may be advantageous for dynamically receiving situational awareness on data feeds. A number of types of data feeds may be stored in the knowledge graph 400. For example, the architecture 300 may be used to predict runway usage based on weather information that the aircraft 100 doesn't have data feeds to during takeoff, such as a global convective weather data product. The runway usage affects fuel usage, taxiing, and the like. A commercial flight may be flying from the United States to India. The information may become relevant that can be queried by the pilot using the system described herein. The information is not available to the pilot immediately as he sets out from the United States. However, the information may become available to the aircraft 100 as the aircraft 100 enters the airspace of that particular country. The processor 204 may dynamically update the knowledge graph 400 with the information regarding the runway usage upon receipt of the information. The pilot may then ask for the information regarding the runway usage, and the processor 204 may autonomously generate the response based on the knowledge graph 400. The experience gathered by the aircraft from the flights may also be utilized in answering a number of causal questions. For example, the architecture 300 may provided a response to the question, last time there was heavy rainfall in India, how long did you spend taxiing or hovering over the airport without being able to land, such that recitations of runway usage is not intended to be limiting.

In embodiments, the knowledge graph 308 may compensate for missing data. The missing data may be compensated for based on one or more statistical functionals. For example, a component part may be missing data regarding the number of times the part has been repaired. The knowledge graph 308 may include similar parts with a number of times in which those parts received maintenance. An average may be computed for the component and linked to the missing data point.

The method described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory. It is further contemplated that each of the embodiments of the method described above may include any other step(s) of any other method(s) described herein. In addition, each of the embodiments of the method described above may be performed by any of the systems described herein. It is to be noted that the specific order of steps in the foregoing disclosed methods are examples of exemplary approaches. Based upon design preferences, it is understood that the specific order of steps in the method can be rearranged while remaining within the scope of the present disclosure.

What is claimed:

1. A line-replaceable unit comprising:
a non-transitory memory maintaining program instructions and a knowledge graph, the knowledge graph including a schema with a plurality of nodes and a plurality of edges based, at least in part, on a mission requirement of an aircraft and one or more aircraft systems of the aircraft, wherein the one or more aircraft systems comprise a hydraulic system, wherein hydraulic components of the hydraulic system are represented by the plurality of nodes with physical connections of the hydraulic components represented as directional edges of the plurality of edges; and
one or more processors configured to execute the program instructions maintained on the memory causing the one or more processors to:
receive an audio input, the audio input corresponding to a query from a user within the aircraft;
convert the audio input to text;
generate a response for the query by performing a causal lookup of the knowledge graph based on the text; and
provide the response to the user;
wherein the program instructions maintained on the memory cause the one or more processors to perform a triage query on the text to determine the text is the causal lookup of the knowledge graph, wherein the causal lookup includes using a natural language processing algorithm to recognize an intent of the text;
wherein the triage query comprises an analysis algorithm, wherein the analysis algorithm performs a search to capture data associated with the intent and processes the data using a machine learning algorithm, wherein by processing the data, the data is related back to the intent;
wherein, based on the directional edges, the machine learning algorithm for causal analysis purposes determines that if one hydraulic component fails other components of the hydraulic system usually fail.

2. The line-replaceable unit of claim 1, wherein the line-replaceable unit is communicatively coupled to a head-mounted display of the aircraft, wherein the audio input is received from the head-mounted display.

3. The line-replaceable unit of claim 2, wherein the response is one of an audible response provided to the user by way of the head-mounted display or an image response provided to the user by way of the head-mounted display.

4. The line-replaceable unit of claim 1, wherein the line-replaceable unit is further configured to update the knowledge graph with real-time data from the one or more aircraft systems according to the schema.

5. The line-replaceable unit of claim 1, wherein the triage query is based on a model generated by one or more of a knowledge graph deep q learning (KGDWN) or a question generation reinforcement learning.

6. The line-replaceable unit of claim 1, wherein the program instructions maintained on the memory cause the one or more processors to generate a predicted next question based on the text and provide a response to the predicted next question to the user.

7. The line-replaceable unit of claim 6, wherein the line-replaceable unit is further configured to request additional information for updating the knowledge graph from mission control in response to generating the predicted next question.

8. The line-replaceable unit of claim 6, wherein the knowledge graph is encoded as a hash, wherein the one or more processors generate the predicted next question based on the hash.

9. The line-replaceable unit of claim 8, wherein the program instructions maintained on the memory cause the one or more processors to generate a similarity metric based on the hash for generating the predicted next question and cause the one or more processors to update the hash with information; wherein the similarity metric is computed based on a hamming distance.

10. The line-replaceable unit of claim 9, wherein the program instructions maintained on the memory cause the one or more processors to invert the hash to generate an updated knowledge graph and provide the updated knowledge graph to mission control.

11. The line-replaceable unit of claim 1, wherein the knowledge graph includes information associated with at least one of a vehicle level health feed from at least one of an electrical system, a thermal system, or an engine system; wherein the knowledge graph includes information associated with wherein the knowledge graph includes information associated with a mission requirement and profile.

12. The line-replaceable unit of claim 11, wherein the knowledge graph includes information associated with at least one of a last known state of a component, a supply-chain database, a weather data, or a ground crew information.

13. A system comprising:
one or more aircraft systems, wherein the one or more aircraft systems comprise a hydraulic system;
a head-mounted display configured to generate an audio input;
a non-transitory memory maintaining program instructions and a knowledge graph, the knowledge graph including a schema with a plurality of nodes and a plurality of edges based, at least in part, on a mission requirement of an aircraft and the one or more aircraft systems of the aircraft, wherein hydraulic components of the hydraulic system are represented by the plurality of nodes with physical connections of the hydraulic components represented as directional edges of the plurality of edges; and
one or more processors configured to execute the program instructions maintained on the memory causing the one or more processors to:
receive the audio input, the audio input corresponding to a query from a user within the aircraft;
convert the audio input to text;
generate a response for the query by performing a causal lookup of the knowledge graph based on the text; and
provide the response to the user by way of the head-mounted display;
wherein the program instructions maintained on the memory cause the one or more processors to perform a triage query on the text to determine the text is the causal lookup of the knowledge graph, wherein the causal lookup includes using a natural language processing algorithm to recognize an intent of the text;

wherein the triage query comprises an analysis algorithm, wherein the analysis algorithm performs a search to capture data associated with the intent and processes the data using a machine learning algorithm, wherein by processing the data, the data is related back to the intent;

wherein, based on the directional edges, the machine learning algorithm for causal analysis purposes determines that if one hydraulic component fails other components of the hydraulic system.

* * * * *